(12) United States Patent  (10) Patent No.: US 9,325,529 B2
Tanimura  (45) Date of Patent: *Apr. 26, 2016

(54) HYBRID TYPE TELEPHONY SYSTEM

(71) Applicant: Juniper Networks, Inc., Sunnyvale, CA (US)

(72) Inventor: Takuji Tanimura, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/872,809

(22) Filed: Apr. 29, 2013

(65) Prior Publication Data

US 2013/0235867 A1  Sep. 12, 2013

Related U.S. Application Data

(63) Continuation of application No. 12/512,624, filed on Jul. 30, 2009, now Pat. No. 8,432,900, which is a continuation of application No. 11/401,949, filed on Apr. 12, 2006, now Pat. No. 7,586,906, which is a continuation of application No. 09/784,140, filed on Feb. 16, 2001, now Pat. No. 7,058,044.

(30) Foreign Application Priority Data

Feb. 22, 2000 (JP) .................. 2000-044364

(51) Int. Cl.
 *H04L 12/66* (2006.01)
 *H04L 12/64* (2006.01)

(52) U.S. Cl.
 CPC ............ *H04L 12/64* (2013.01); *H04L 12/6418* (2013.01); *H04L 2012/6472* (2013.01); *H04L 2012/6481* (2013.01)

(58) Field of Classification Search
 None
 See application file for complete search history.

(56) References Cited

U.S. PATENT DOCUMENTS

| | | | |
|---|---|---|---|
| 5,438,614 A | 8/1995 | Rozman et al. | |
| 6,069,890 A | 5/2000 | White et al. | |
| 6,154,465 A | 11/2000 | Pickett | |
| 6,208,658 B1 * | 3/2001 | Pickett | .................. 370/401 |
| 6,233,234 B1 | 5/2001 | Curry et al. | |
| 6,252,952 B1 | 6/2001 | Kung et al. | |
| 6,353,610 B1 | 3/2002 | Bhattacharya et al. | |

(Continued)

FOREIGN PATENT DOCUMENTS

| | | |
|---|---|---|
| JP | 08-111692 | 4/1996 |
| JP | 10-308777 | 11/1998 |

(Continued)

*Primary Examiner* — Chi H Pham
*Assistant Examiner* — Soon-Dong D Hyun
(74) *Attorney, Agent, or Firm* — Harrity & Harrity, LLP

(57) ABSTRACT

A hybrid type telephony system capable of establishing a connection between conventional type telephone sets contained in an exchange unit and LAN type telephone sets contained in an IP network, the system comprising: a gateway circuit connected between the exchange unit and the IP network and performing voice data format conversion, and a central control unit connected to the LAN of the IP network for establishing a communication path to the exchange unit via a control bus, controlling switching of IP packets of the IP network, managing IP address information of the LAN type telephone sets and the gateway circuit via the LAN, and controlling connection between the LAN type telephone sets and connection between the LAN type telephone sets and the gateway circuit.

20 Claims, 4 Drawing Sheets

(56) References Cited

U.S. PATENT DOCUMENTS

| | | |
|---|---|---|
| 6,363,065 B1 | 3/2002 | Thorton et al. |
| 6,381,238 B1 | 4/2002 | Hluchyj |
| 6,400,707 B1 * | 6/2002 | Baum et al. .................. 370/352 |
| 6,400,719 B1 | 6/2002 | Chimura et al. |
| 6,453,034 B1 | 9/2002 | Donovan et al. |
| 6,570,879 B1 | 5/2003 | Kikuchi |
| 6,570,976 B2 | 5/2003 | Asada et al. |
| 6,611,591 B1 | 8/2003 | McNiff et al. |
| 6,614,781 B1 * | 9/2003 | Elliott et al. ................. 370/352 |
| 6,671,883 B1 * | 12/2003 | Rahman ........................ 725/123 |
| 6,714,637 B1 * | 3/2004 | Kredo ...................... 379/215.01 |
| 6,741,705 B1 | 5/2004 | Nelson et al. |
| 6,754,224 B1 | 6/2004 | Murphy |
| 6,754,328 B1 * | 6/2004 | Takahashi ................ 379/220.01 |
| 6,798,767 B1 | 9/2004 | Alexander et al. |
| 6,804,254 B1 | 10/2004 | Pearce et al. |
| 6,836,476 B1 * | 12/2004 | Dunn et al. .................... 370/352 |
| 7,058,044 B2 | 6/2006 | Tanimura |
| 7,586,906 B2 | 9/2009 | Tanimura |
| 2003/0002475 A1 | 1/2003 | Derks |
| 2003/0095541 A1 | 5/2003 | Chang et al. |
| 2009/0296695 A1 | 12/2009 | Tanimura |

FOREIGN PATENT DOCUMENTS

| | | |
|---|---|---|
| JP | 11-205831 | 7/1999 |
| JP | 11-331371 | 11/1999 |
| JP | 2000-295645 | 10/2000 |

* cited by examiner

--PRIOR ART--

HYBRID TYPE TELEPHONY SYSTEM

RELATED APPLICATIONS

This application is a continuation of U.S. patent application Ser. No. 12/512,624, filed Jul. 30, 2009, which is a continuation of U.S. patent application Ser. No. 11/401,949, filed Apr. 12, 2006 (now U.S. Pat. No. 7,586,906), which is a continuation of U.S. patent application Ser. No. 09/784,140, filed Feb. 16, 2001 (now U.S. Pat. No. 7,058,044). The contents of all these applications are incorporated herein by reference.

BACKGROUND OF THE INVENTION

1. Field of the Invention

The present invention relates to a hybrid type telephony system and in particular, to a hybrid type telephony system capable of providing a single service to both of a conventional type telephone set contained in a time-division switch and a LAN type telephone set contained a LAN.

2. Description of the Related Art

With reference to FIG. 4, explanation will be given on a conventional telephony system including a private branch exchange unit and a LAN type telephone system.

In FIG. 4, a private branch exchange unit 150 is based on a time-division switch 100. The time division switch 100 has a function for switching 64-Kbps time division data. A central control unit 101 has a function for controlling the entire exchange unit 150. A subscriber circuit 102 and a subscriber circuit 103 are interface circuits of conventional type telephone sets having a function of voice interface and a function to control conventional type telephone sets. A trunk circuit 104 has an interface function for interfacing with other exchange units and apparatuses. A gateway 107 has a function for data conversion between time division data handled by a private branch exchange unit and voice packets handled by a LAN type telephone system. Conventional type telephone sets 105 and 106 may be ordinary analog telephone sets or multi-function telephone sets for a private branch exchange unit. Moreover, a LAN switch 108 has a function for switching packets on the LAN. A LAN 109 and a LAN 110 are LAN networks. A LAN type telephone set 111, a LAN type telephone set 112, and a LAN type telephone set 113 are LAN type telephone sets connected contained in the LAN. A server 114 has a function for a call connection between the LAN type telephone sets 111, 112, 113 and the gateway 107 and other service.

When constructing a telephone service system by using a private branch exchange unit and a LAN type telephone system, the exchange unit 150 is connected to the LAN type telephone system via the gateway 107. In this case, a line having a 64-Kbps speed is used for connection between the trunk circuit 104 of the private branch exchange unit 150 and the gateway 107 while a LAN is used for connection from the gateway 107 to the LAN switch 108.

For example, when calling from the conventional type telephone set 105 to the LAN type telephone set 111, upon off-hook of a receiver of the conventional type telephone set 105, the subscriber circuit 102 connected to the conventional type telephone set detects the off-hook and reports it to the central control unit 101.

The central control unit 101 performs a call processing such as sending a dial tone to the conventional type telephone set 105 and receives a selection signal as a telephone number of the destination from the conventional type telephone set 105. In this case, the selection signal is a combination of an access number for catching the trunk 104 and a telephone number of the LAN type telephone set 111 on the LAN type telephone system. For example, when it is assumed that the access number for catching the trunk 104 is "8" and the telephone number of the LAN type telephone set 111 is "111", the selection signal will be "8111".

The central control unit 101, upon recognition of that the selection signal from the conventional type telephone set 105 is "8111", establishes a communication path between the subscriber circuit 102 and the trunk circuit 104 through the time division switch 100 and transmits a selection signal "111" from the trunk 104 to the gateway 107.

With this, the gateway 107 recognizes that the call from the trunk 10 is a call to the LAN type telephone set 111 and performs a call processing to the server 114 including inquire of the IP address of the LAN type telephone set 111, so that a voice information packet is transmitted and received between the gateway 107 and the LAN type telephone set 111. This enables communication between the conventional type telephone set 105 and the LAN type telephone set 111.

Moreover, Japanese Patent Publication 10-308777 discloses a voice exchange system of a LAN terminal in which a LAN subscriber circuit is contained in a line interface block of an electronic exchange unit to which a terminal such as a LAN type telephone set is connected via a LAN. In this voice exchange system, voice data from a LAN terminal always passes through the LAN subscriber circuit and the main switch of the electronic exchange unit. Accordingly, even a communication between two LAN type telephone sets on the LAN is performed via a path formed by a first LAN type telephone set, a first LAN subscriber circuit, the main switch, a second LAN subscriber circuit, and a second LAN type telephone. In this case, voice compression is performed as follows. Firstly, voice data is compressed in the first LAN type telephone set 1 and transmitted via the LAN to the first LAN subscriber circuit, where the voice data is restored. After this, the voice data is transmitted from the first LAN subscriber circuit to the main switch and then compressed in the second LAN subscriber circuit. The compressed voice data is restored in the second LAN type telephone set.

In the conventional telephony system using a private branch exchange unit and a LAN type telephone system, the private branch exchange unit and the LAN type telephone system operate as completely different systems which are connected via a gateway. Accordingly, it is impossible to provide a unitary service. For example, for a communication between a conventional type telephone set contained in a private branch exchange unit and a LAN type telephone set it is necessary to input an access number (such as 8) indicating a route via a gateway and a telephone number (such as 111) in a destination system.

Moreover, in the aforementioned voice exchange system, voice data is significantly deteriorated because compression-restore is repeated twice. Moreover, compression and restore require not little time. Furthermore, when transmitting a voice packet using a LAN, the voice packet transmission is delayed with a delay time fluctuating depending on the packet. To cope with this, a plurality of voice packets is accumulated for a predetermined period of time before restoring the voice packets, so as to absorb the fluctuation. However, while repeating the compression-restore process, the time for absorbing the fluctuations becomes great resulting in a great delay time, greatly affecting the voice quality.

SUMMARY OF THE INVENTION

It is therefore an object of the present invention to provide a hybrid type telephony system integrating an exchange unit and a LAN type telephone system so as to prove a common service to all the telephone sets.

Another object of the present invention is to provide a hybrid type telephony system integrating a private branch exchange unit and a LAN type telephone system capable of maintaining a voice quality and providing a unitary service.

The hybrid telephony system according to the present invention is characterized in that conventional type telephone sets contained in a time division switch of an exchange unit such as a private branch exchange unit and LAN type telephone sets contained in a LAN are contained in an integrated apparatus, enabling to provide an integrated service for the conventional telephone sets contained in the time division switch and the LAN type telephone sets contained in the LAN without distinguishing them from each other. More specifically, in the hybrid telephony system integrating the private branch exchange unit and the LAN type telephone system, traffic between the conventional type telephone sets contained in the exchange unit or traffic between the LAN type telephone sets contained in the LAN type telephone system are connected by the time division switch and the IP switch, respectively. As for traffic between the conventional type telephone sets contained in the exchange unit and the LAN type telephone sets contained in the LAN type telephone system is connected by performing voice data format conversion via a gateway circuit between the time division switch and the IP network (such as an IP switch).

The hybrid type telephony system according to the present invention is capable of establishing a connection between conventional type telephone sets contained in an exchange unit and LAN type telephone sets contained in an IP network, the system comprising: a gateway circuit connected between the exchange unit and the IP network and performing voice data format conversion, and a central control unit connected to the LAN of the IP network for establishing a communication path to the exchange unit via a control bus, controlling switching of IP packets of the IP network, managing IP address information of the LAN type telephone sets and the gateway circuit via the LAN, and controlling connection between the LAN type telephone sets and connection between the LAN type telephone sets and the gateway circuit.

More specifically, the hybrid telephony system includes: a time division switch for switching between subscriber circuits and a time division multi-path of the gateway and switching PCM signals input/output from/to the subscriber circuits and the gateway circuit; an IP switch for switching IP packets flowing on the LAN (see 30 to 34 in FIG. 1) according to destination information contained in the header of each of the IP packets; and a central control unit for controlling the time division switch, the IP switch, the subscriber circuits, and the gateway circuit as well as packet routing between the LAN type telephone sets and the gateway circuit by communication with the LAN type telephone sets using the LAN. The gateway circuit makes a PCM data from the time division switch into an IP packet and transmits the packet to the LAN (34). Upon reception of an IP packet from the LAN (34), the gateway circuit transmits a voice data in the IP packet to the time division switch (12). Here, data passing between the time division switch and the gateway circuit is performed using PCM data (in case voice data is compressed for passing on the LAN, the gateway circuit has the function for voice compressing/restoring). Moreover, the subscriber circuits contain conventional type telephone sets (25, 26), transmits/receives a voice signal between the conventional type telephone sets and the time division switch, monitors the states of the conventional type telephone sets, reports states such as call and release to the central control unit, and upon reception an instruction from the central control unit, causes ringing. The LAN type telephone sets (20 to 22) has a LAN interface and has a function for transmitting and receiving voice data and call processing information using IP packets.

The conventional type telephone sets transmit and received voice signals to/from the subscriber circuits and is switched by the time division switch for communication with a destination. The LAN (30 to 34) are connected to the IP switch for transmitting and receiving IP packets. The time division network (40) is a time division network of 64-Kbps basis and connected to another exchange unit or the like. The WAN (41) is connected via a network router (45) for transmitting and receiving packets to be transmitted/received to/from a remote LAN. The router (45) has a routing function for routing packets to be transmitted/received to/from a remote location using the WAN (41). The call control, service control, and the maintenance/operation service are integrated in a single central control unit, thereby enabling to provide an integrated service.

[Function]

The hybrid system including a conventional exchange unit (such as a private branch unit) system using the time division switch as a kernel and a LAN type telephone system constituted by LAN type telephone sets functions as follows. For a call between conventional type telephone sets contained in the conventional exchange unit and a call between LAN type telephone sets contained in the LAN type telephone system, a connection is made on the time division switch and the LAN switch/LAN, respectively. As for traffic between a conventional telephone set contained in the conventional exchange unit and a LAN type telephone set, connection is established by performing a voice data format conversion via the gateway circuit. The central control unit performing control of the time division switch and the LAN switch is contained in a LAN connected to the LAN switch and transmits/receives call information and destination IP address via the LAN, and controls the traffic between the conventional telephone sets contained in the conventional exchange unit and the LAN type telephone sets via the gateway circuit and the time division switch communication path.

By arranging both of the conventional telephone sets 25, 26 contained in the time division switch and the LAN type telephone sets 20, 21, 22 contained in LAN in the hybrid telephony system, it is possible to provide an integrated service without distinguishing between the conventional type telephone sets 25, 26 and the LAN type telephone sets 20, 21, 22.

DESCRIPTION OF THE PREFERRED EMBODIMENTS

Description of Configuration

Figure 1:
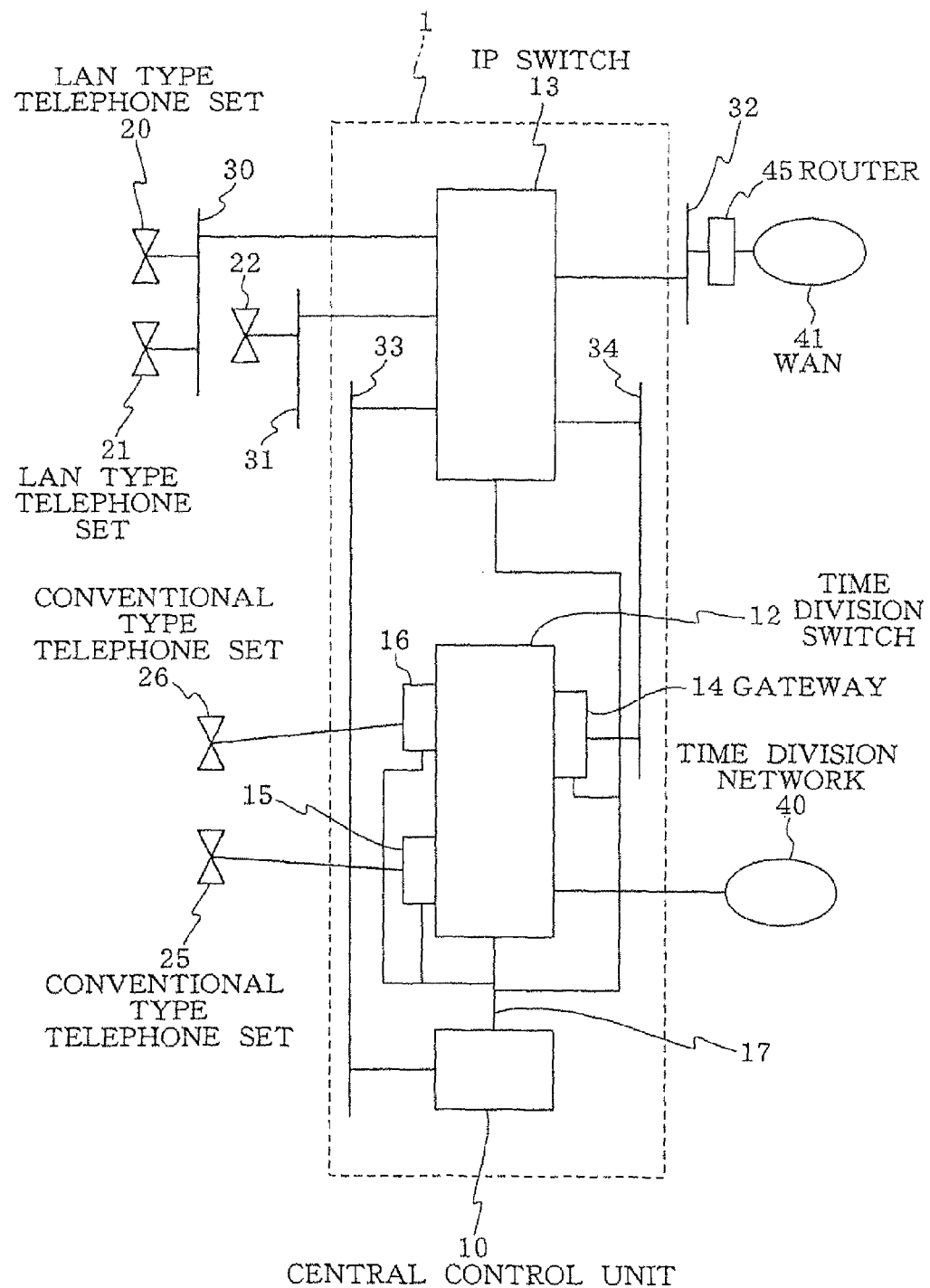
FIG. 1 shows a hybrid type telephony system according to a first embodiment of the present invention.

FIG. 1 shows a hybrid type telephony system according to a first embodiment of the present invention. The hybrid type telephony system 1 according to the first embodiment includes: a central control unit 10; a time division switch 12 having a gateway circuit 14 and subscriber circuits 15 and 16; an IP switch 13; and a control bus 17 used by the central control unit 10 for controlling the time division switch 12, the IP switch 13, the subscriber circuits 15 and 16, and the gateway 14. Moreover, the hybrid type telephony system 1 includes LAN's 33 and 34 connected to the IP switch 13. The central control unit 10 is contained in the LAN 33 while the gateway 14 is contained in the LAN 34.

The central control unit 10 controls the entire hybrid type telephony system 1. Using the control bus 17, the central control unit 10 controls the time division switch 12, the IP switch 13, the subscriber circuits 15 and 16, and the gateway circuit 14. Moreover, using the LAN, the central control unit 10 performs communication with LAN type telephone sets 20, 21, 22 and controls packet routing between the LAN type telephone sets 20, 21, 22 and the gateway circuit.

The time division switch 12 performs switching between time division multi-paths of the subscriber circuits 15, 16 and the gateway 14 as well as switching of PCM and other signals input/output from/to the subscriber circuits 15, 16, and the gateway circuit 14.

The IP switch 13 switches packets according to destination information contained in the header of each IP packet flowing to the LAN's 30, 31, 32, 33, 34.

The gateway 14 has a function to makes PCM data from the time division switch 12 into an IP packet and transmit it to the LAN 34 and a function to transmit to the time division switch 12 a voice data contained in the IP packet received from the LAN 34. Here, data is passed between the time division switch 12 and the gateway 14 using a 64-Kbps PCM data. Since voice data is compressed for transmission and reception on the LAN, the gateway 14 also has the function for voice compression and restore.

The subscriber circuits 15 and 16 contain conventional type telephone sets 25 and 26 and passes a voice signal between the conventional type telephone sets 25 and 26 and the time division switch 12, monitors a state of the conventional type telephone sets, reports states such as call and release to the central control unit 10, and causes to the conventional type telephone sets 25, 26 to ring.

The LAN type telephone sets 20, 21, 22 have a LAN interface function and a function for transmitting and receiving voice data and call process information using an IP packet.

The conventional type telephone sets 25 and 26 transmit and receive a voice signal to/from the subscriber circuits 15 and 16, respectively and can communicate with a destination switched by the time division switch 12.

The LAN's 30, 31, 32, 33, 34 are connected to the IP switch 13 and can transmit receive IPO packets.

The time division network 40 is a 64-Kbps based time division network which is connected to another exchange unit and the like.

A WAN 42 is a network for transmitting and receiving packets to be transmitted to/from a remote LAN and is connected via a router 45.

The router 45 has a routing function for routing a packet to be transmitted/received to/from a remote location using the WAN 41.

Since the gateway unit 14 is well know to those skilled in the art and does not constitute the main portion of the present invention, its details are omitted here.

It should be noted that while the aforementioned embodiment has been explained using the conventional type telephone sets 25 and 26 as terminals to be contained in the time division switch 12, it is also possible to use a multi-function telephone used in a exchange unit, PHS (personal handy phone system), ISDN (integrated services digital network), and the like, including an image terminal or data terminal.

Moreover, while explanation has been given on the LAN type telephone sets 20, 21, 22 as the terminals to be contained on the LAN, it is also possible to use other apparatuses such as a personal computer having a voice interface.

While the embodiment has been explained using the gateway 14 having a function for compressing voice data to be made into a packet, whether to compress voice data or not can be selected as is desired.

[Description of Operation]

Next, explanation will be given on the operation of the hybrid type telephony system of the first embodiment shown in FIG. 1. Operation for connection between conventional type telephone sets, between LAN type telephone sets, and between a conventional type telephone set and a LAN type telephone set will be explained as a connection between the conventional type telephone set 25 and the conventional type telephone set 26, a connection between the LAN type telephone set 20 and the LAN type telephone set 21, and a connection between the LAN type telephone set 20 and the conventional type telephone set 25, in this order.

(1) Calling from the Conventional Type Telephone Set 25 to the Conventional Type Telephone Set 26

When a receiver of the conventional type telephone set 25 is hooked off, the subscriber circuit 15 containing the conventional type telephone set 25 detects the off-hook and reports it to the central control unit 10. The central control unit 10 performs a call processing by transmitting a dial tone to the conventional type telephone set 25 and causing to operate a linger of the conventional type telephone set 26 as the destination using a selection signal which is a telephone number of the destination from the conventional type telephone set 25. When the conventional type telephone set 26 responds to this, the central control unit 10 establishes a communication path of the time division switch 12, thus completing the call processing.

(2) Calling from the LAN Type Telephone Set 20 to the LAN Type Telephone Set 21

When an off-hook occurs in the LAN type telephone set 20, a dial tone can be heard from a receiver of the LAN type telephone set 20. In this state, when the selection number of the destination LAN type telephone set is input, the LAN type telephone set 20 transmits a packet for a call processing to the central control unit 10.

Here, the IP address of the central control unit 10 is set in each of the LAN type telephone sets in advance, and an IP address of the destination LAN type telephone set can be identified by inquiring the central control unit upon call. Moreover, the LAN type telephone set 20 is contained in the LAN 30 and the central control unit 10 is contained in the LAN 33. Accordingly, the IP packet from the LAN type telephone set 20 is switched to the LAN 33 by the IP switch 13 to reach the central control unit 10.

Upon call from the LAN type telephone set 20, if the destination LAN type telephone set 21 is in an idle state, the central control unit 10 reports a response wait to the LAN type telephone set 20 and the LAN type telephone set 20 transmits a ring back tone to the receiver. Moreover, the central control unit 10 reports an incoming to the LAN type telephone set 21 to cause the LAN type telephone set 21 to ringer. After this, when the LAN type telephone set 21 is hooked off, the LAN type telephone set 21 reports an incoming response to the central control unit 10. The central control unit 10 reports the IP address of the LAN type telephone set 20 to the LAN type telephone set 21 and the IP address of the LAN type telephone set 21 to the LAN type telephone set 20. Upon reception of the IP addresses, the LAN type telephone sets 20 and 21 can communicate with each other by transmitting voice packets.

In case of communication between the LAN type telephone set 20 and the LAN type telephone set 21, since they are contained in the same LAN 30, IP packets passed directly between them. However, in case of communication between the LAN type telephone set 20 contained in the LAN 30 and the LAN type telephone set 22 contained in the LAN 31 for example, IP packets are switched by the IP switch 13 and they are passed via the IP switch.

(3) Calling from the LAN Type Telephone Set 20 to the Conventional Type Telephone Set 25

When the LAN type telephone set 20 is hooked off, a dial tone can be heard from the receiver of the LAN type telephone set 20. In this state, when the selection signal of the destination conventional type telephone set is input, the LAN type telephone set 20 transmits a call processing packet to the central control unit 10.

If the conventional type telephone set 25 is in the idle state, the central control unit 10 instructs the subscriber circuit 15 containing the conventional telephone set 25 to ring and a call ring can be heard from the receiver of the conventional telephone set 25. Simultaneously with this, the central control unit 10 reports to the LAN type telephone set 20 that the destination is being called and a ring back tone can be heard from the LAN type telephone set 20. When the conventional telephone set 25 answers by off-hook, the subscriber circuit 15 containing the conventional type telephone set 25 reports the response to the central control unit 10. Upon reception of the report of the response from the subscriber circuit 15, the central control unit 10 reports the response to the LAN type telephone set 20 and controls the time division switch to establish a communication path between the subscriber circuit 15 and the gateway circuit 14. The central control unit 10 reports the IP address of the gateway circuit 14 to the LAN type telephone set 20 and the IP address of the LAN type telephone set 20 to the gateway circuit 14.

The LAN type telephone set 20 and the gateway circuit 14 transmits voice packets to the IP addresses of the gateway circuit 14 and the LAN type telephone set 20, respectively, thus passing packets on the IP. By performing this together with the aforementioned communication path establishment by the time division switch 12, communication can be performed between the LAN type telephone set 20 and the conventional type telephone set 25.

Thus, by establishing the communication path of the time division switch 12 and transmitting the destination IP addresses to the LAN type telephone set and the gateway circuit 14, the central control unit 10 performs control enabling any communication in the hybrid type telephony system, thereby enabling to constitute a single-management system according to the present embodiment and to provide an integrated service between a conventional type telephone set contained in the time division switch 12 and a LAN type telephone set.

Other Embodiments

While the present invention has been described using an example of a network having a LAN and a LAN switch, the network system may be any packet network.

Figure 2:
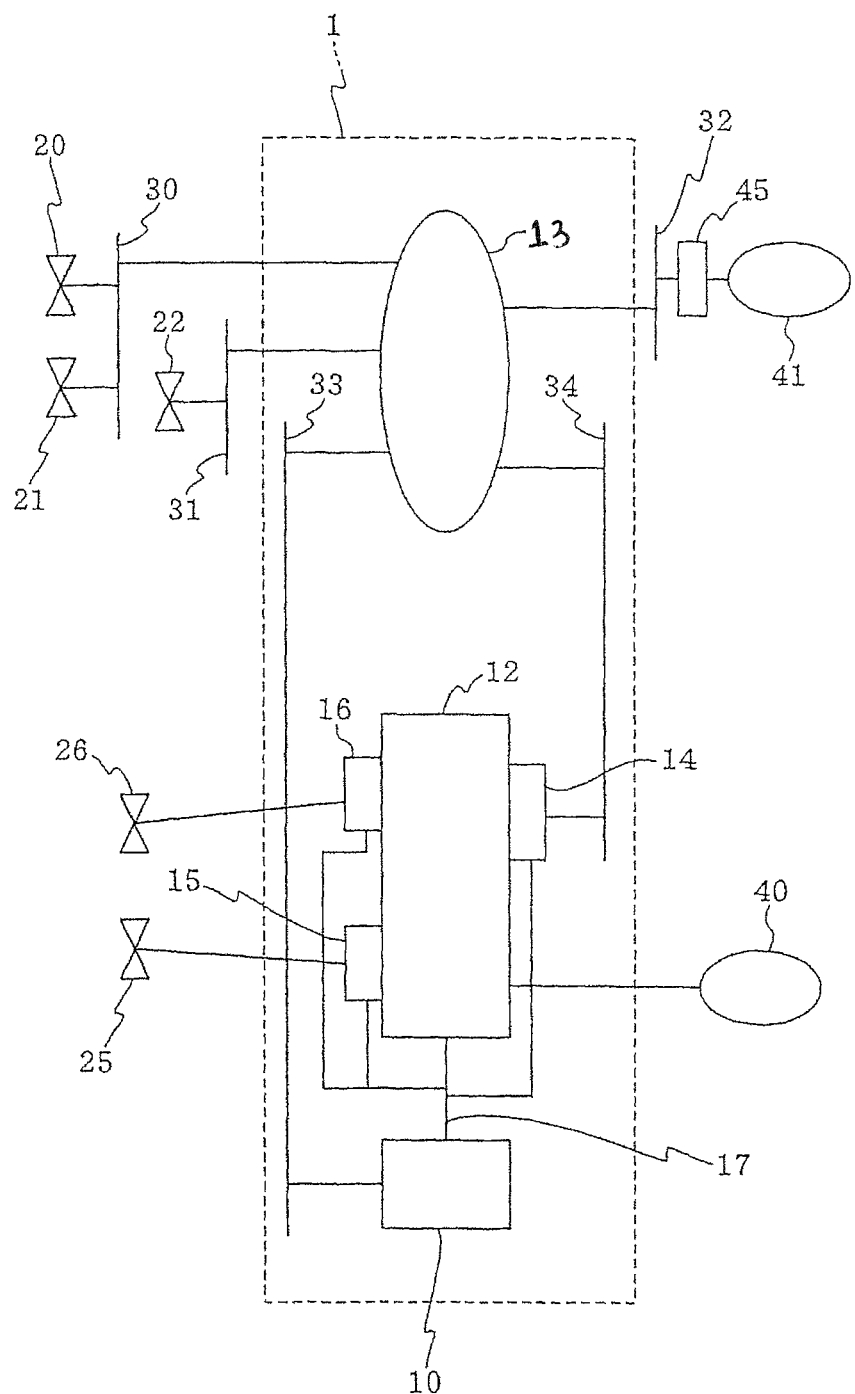
FIG. 2 shows a hybrid type telephony system according to a second embodiment of the present invention.

FIG. 2 shows a second embodiment of the present invention applied to an IP network. In this embodiment, it is possible to constitute an IP network in which routing control is performed by a hub or the like, thereby eliminating need of packet switching control by the central processing unit 17. Moreover, the IP network may employ, for example, an ATM or a frame relay.

Moreover, the aforementioned embodiments of the telephony service may be realized, for example, as follows. A single extension representation number is assigned for a group consisting of a plurality of conventional type telephone sets and LAN type telephone sets. For a call from one of the telephone sets contained in the group or from a telephone set outside, the central control unit performs an incoming control for all the conventional type telephone sets and the LAN type telephone sets in the group so that all the telephone sets in the group receive the incoming signal and any of the conventional type telephone sets and any of the LAN type telephone sets can answer. Such a telephony system can be provided by the present invention.

Moreover, another example of a unitary service for both of the conventional type telephone sets and the LAN type telephone sets is realized as follows. Since the central control unit can perform the entire management, when a call is made from a conventional type telephone set to a LAN type telephone set having a display function such as an LCD, it is possible to display on the LCD the telephone number of the conventional type telephone set which has made the call. In case a call is made to a conventional type telephone set having a display function such as an LCD, it is possible to display the telephone number of the calling telephone set.

Figure 3:
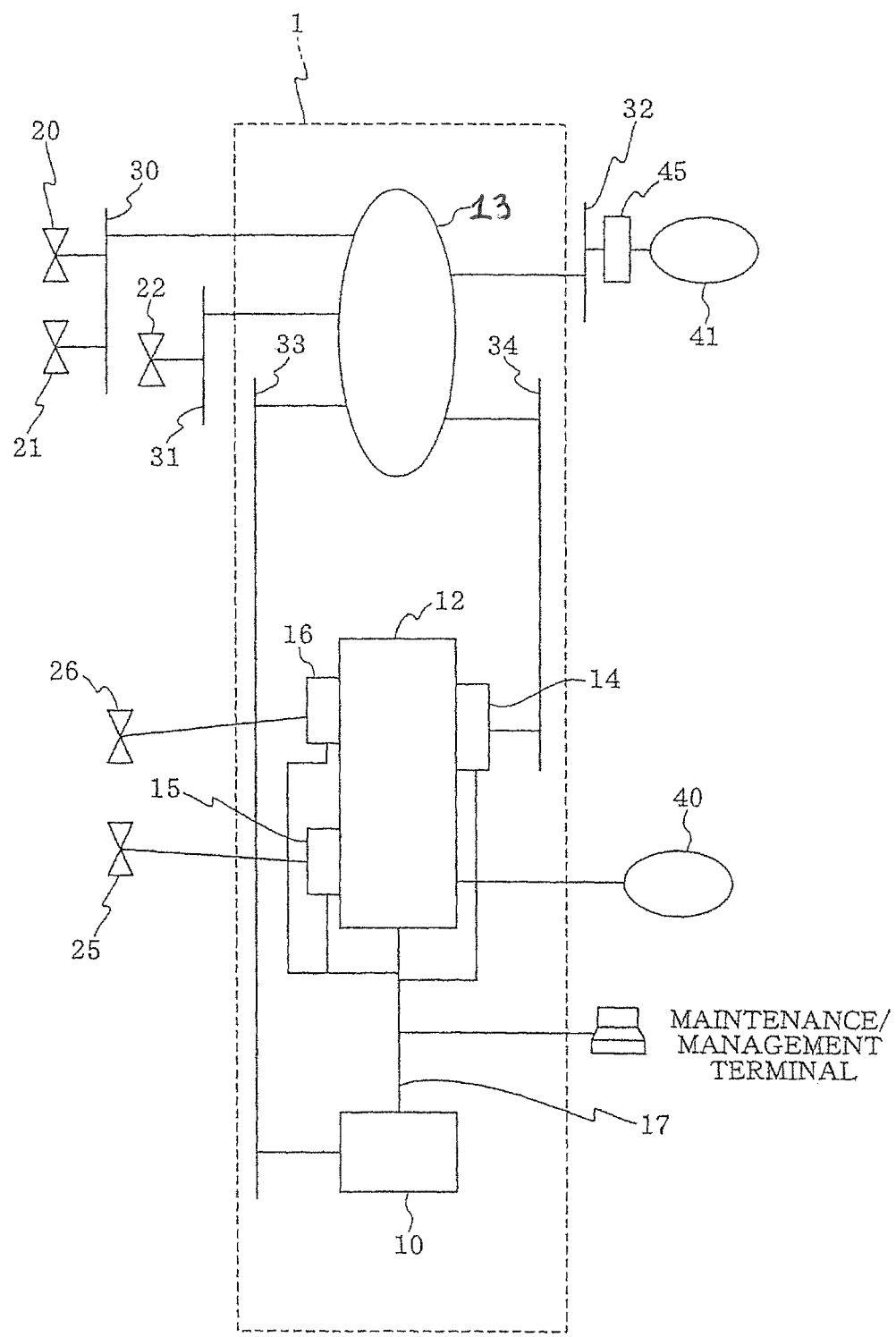
FIG. 3 shows a hybrid type telephony system according to a third embodiment of the present invention.
Figure 4:
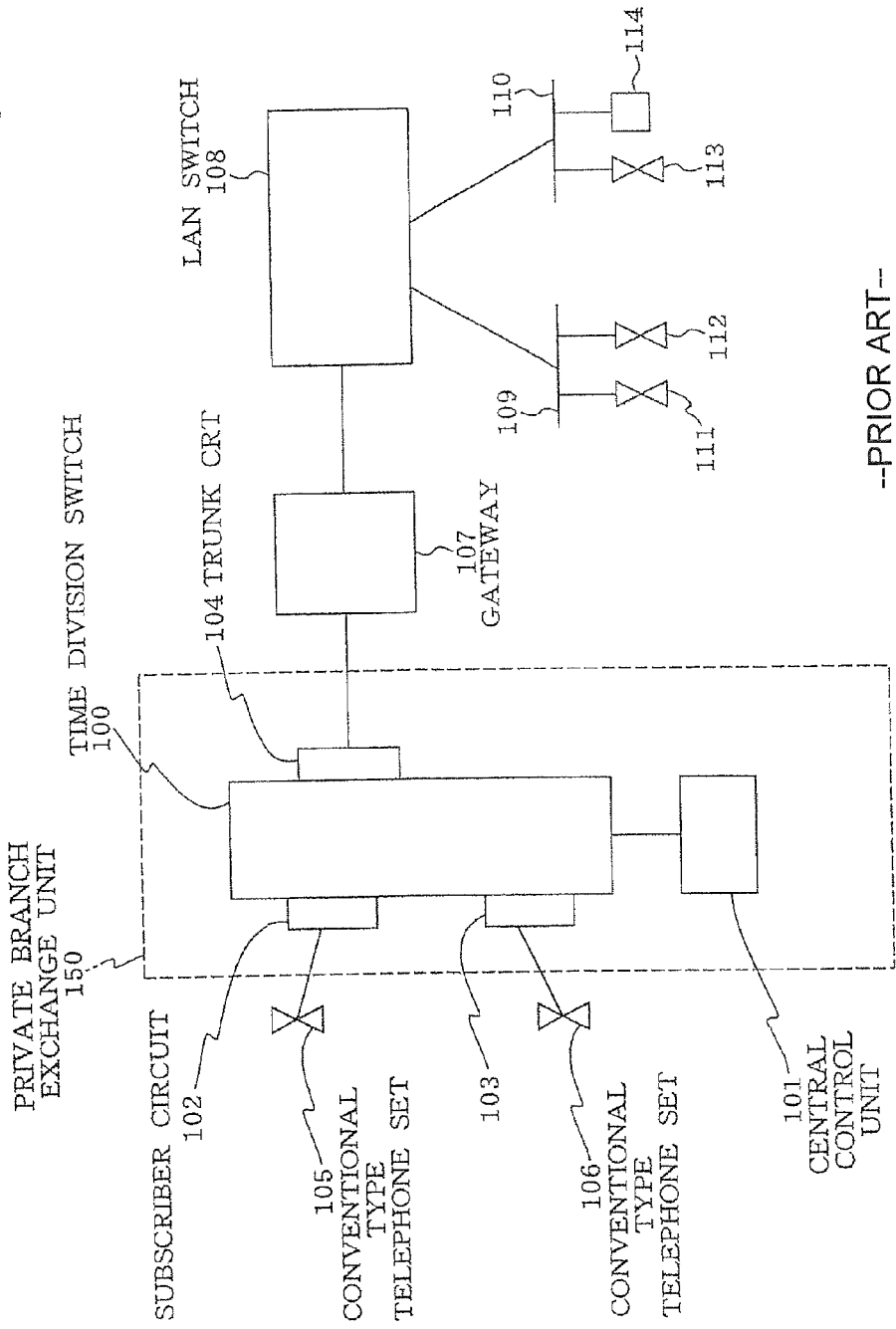
FIG. 4 shows a conventional telephony system using a private branch exchange unit and a LAN type telephone system.

Furthermore, with the configuration for the entire management by the central control unit, it is possible to employ a maintenance-management configuration for setting extension telephone numbers and the like and performing maintenance via single interface. FIG. 3 shows a system capable of providing such a service. A maintenance/management terminal is provided of a single interface on the central control unit bus for performing various settings, maintenance, and management, so that the central control unit can set control data and monitor control FIG. 3 shows a configuration for realizing such maintenance/management by providing a maintenance terminal in the central control unit. Since the conventional exchange unit system and the LAN type telephone system are operated as a unitary block by the central control unit, data setting and maintenance can easily be performed with a single interface. Moreover, telephone numbers of conventional type telephone and LAN type telephone sets can be assigned without limit from the maintenance terminal.

It should be noted that the central control unit has been described as single central control unit physically but it can also be realized by a plurality of central control units for dispersing the load or for other reasons.

As is clear from the aforementioned, the present invention can provide the following effects.

The first effect is that a conventional type telephone set contained in a time division switch or the like and a LAN type telephone set connected to a LAN can be contained in single system, thereby enabling to provide an integrated telephony service between the conventional type telephone set and the LAN type telephone set. This enables a conventional type telephone set to get the same service as the LAN type telephone system.

For example, the control form in the central control unit can be set as follows.

(a) A plurality of conventional type telephone sets and LAN type telephone sets are unified into a single group of predetermined size and one extension representation number is assigned for the group. When a call is made to the extension representation number, all the telephone sets in the group receive the incoming signal, so that any of the conventional type telephone sets or the LAN type telephone sets can answer. Such a telephony service is enabled.

(b) For example, when a call is made from a conventional type telephone set to a LAN type telephone set having a display function such as LCD, it is possible to display the telephone number of the calling conventional type telephone set. In case a conventional telephone set has the display function such as an LCD, the telephone number of the calling telephone set can be displayed on the LCD. Thus, various services of the conventional exchange unit (private branch exchange unit) can be provided for both of the conventional type telephone sets and the LAN type telephone sets without distinguishing them from each other.

The second effect is that the conventional exchange unit (such as a private branch exchange unit) and the LAN type telephone system are operated as a unitary block, data setting and maintenance can be performed with a single interface.

The third effect is that since the conventional exchange unit (such as a private branch exchange unit) and the LAN type telephone system are operated as a unitary block, for example, there is no need of distinguishing the exchange system and the LAN type telephone system from each other. Telephone numbers can be assigned without any particular limit.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-044364 (Filed on Feb. 22, 2000) including specification, claims, drawings and summary are incorporated herein by reference in its entirety.

What is claimed is:

1. A method comprising:
controlling, by a control unit of a system, a first switch of the system to receive a first type of information;
controlling, by the control unit, a gateway of the system to convert the first type of information into a second type of information; and
controlling, by the control unit, the gateway to forward the second type of information towards a second switch of the system,
the control unit being directly connected to the first switch, the second switch, and the gateway via a control bus.

2. The method of claim 1, further comprising:
controlling, by the control unit, the second switch to send the second type of information to a destination.

3. The method of claim 1, where the system is a telephony system.

4. The method of claim 1,
where the first type of information includes pulse-code modulation (PCM) data, and
where the second type of information includes Internet Protocol (IP) packets.

5. The method of claim 1,
where the first type of information includes Internet Protocol (IP) packets, and
where the second type of information includes voice data.

6. The method of claim 1, where the first switch is an Internet Protocol (IP) switch or a time division switch.

7. The method of claim 1, where the second switch is an Internet Protocol (IP) switch or a time division switch.

8. The method of claim 1,
where the first type of information is received from a first telephone device,
where the method further comprises:
sending the second type of information to a second telephone device.

9. The method of claim 8,
where the first telephone device is a first type of telephone device,
where the second telephone device is a second type of telephone device, and
where the second type of telephone device is different from the first type of telephone device.

10. The method of claim 1, further comprising:
transmitting the first type of information from the first switch to the gateway by using 64 kilobits per second (Kbps) pulse-code modulation (PCM) data.

11. A method comprising:
controlling, by a control unit of a system, a particular switch to establish a communication path between a first circuit of the system and a second circuit of the system;
controlling, by the control unit, the first circuit to convert a first type of information, received from a first type of telephone device, into a second type of information; and
controlling, by the control unit, the first circuit to forward the second type of information to a second type of telephone device via the communication path and the second circuit,
the control unit being directly connected to the particular switch, the first circuit, and the second circuit via a control bus.

12. The method of claim 11,
where the first circuit is a gateway circuit,
where the second circuit is a subscriber circuit, and
where the first type of information includes Internet Protocol (IP) packets.

13. The method of claim 11,
where the first type of telephone device is a LAN-type telephone device, and
where the second type of telephone device is an analog telephone device.

14. The method of claim 11, further comprising:
receiving, by the control unit, a call processing packet from the first type of telephone device; and
instructing, before the communication path is established and based on the call processing packet, the second circuit to ring the second type of telephone device.

15. The method of claim 11, further comprising:
reporting, by the second circuit and before the communication path is established, a response of the second type of telephone device to the control unit; and
reporting, by the control unit, the response to the first type of telephone device.

16. The method of claim 11,
reporting, by the control unit, a first address associated with the first circuit to the first type of telephone device; and
reporting, by the control unit, a second address associated with the first type of telephone device to the first circuit.

17. A system comprising:
a first circuit to receive a first type of information from a first type of telephone device;
a second circuit to:
convert the first type of information into a second type of information, and forward the second type of information to a second type of telephone device;

a control bus; and a control unit to control the first circuit and the second circuit,
the control unit being directly connected to the first circuit and the second circuit via the control bus.

18. The system of claim 17, further comprising:
a switch to establish a communication path between the first circuit and the second circuit.

19. The system of claim 18,
where the control unit is further to control the switch, and
where control unit is further directly connected to the switch via the control bus.

20. The system of claim 17,
where the first type of telephone device is a local area network (LAN-type telephone device,
where the second type of telephone device is an analog telephone device,
where the first type of information includes Internet Protocol (IP) packets, and
where the second type of information includes voice data.

\* \* \* \* \*